(12) United States Patent
Golpe et al.

(10) Patent No.: US 11,230,309 B2
(45) Date of Patent: *Jan. 25, 2022

(54) CHARGING SYSTEM FOR ELECTRIC VEHICLES

(71) Applicant: TransTech of South Carolina, Inc., Piedmont, SC (US)

(72) Inventors: William Golpe, Taylors, SC (US); Stacy Neil Smith, Piedmont, SC (US); Steven Halbert, Greenville, SC (US)

(73) Assignee: Transtech of South Carolina, INC, Piedmont, SC (US)

( * ) Notice: Subject to any disclaimer, the term of this patent is extended or adjusted under 35 U.S.C. 154(b) by 116 days.

This patent is subject to a terminal disclaimer.

(21) Appl. No.: 16/564,975

(22) Filed: Sep. 9, 2019

(65) Prior Publication Data

US 2019/0389497 A1 Dec. 26, 2019

Related U.S. Application Data

(63) Continuation-in-part of application No. 15/592,947, filed on May 11, 2017, now Pat. No. 10,406,922.

(60) Provisional application No. 62/335,318, filed on May 12, 2016.

(51) Int. Cl.
| | |
|---|---|
| *H01M 10/46* | (2006.01) |
| *B61L 15/00* | (2006.01) |
| *B61L 3/10* | (2006.01) |
| *B61L 1/18* | (2006.01) |
| *B61L 3/20* | (2006.01) |
| *B61L 1/02* | (2006.01) |

(52) U.S. Cl.
CPC ............. *B61L 15/0036* (2013.01); *B61L 1/18* (2013.01); *B61L 3/103* (2013.01); *B61L 3/20* (2013.01); *B61L 1/02* (2013.01)

(58) Field of Classification Search
CPC ...... H02J 7/0044; H02J 7/0045; H02J 7/0018; H02J 50/10; H02J 50/005; B61L 1/18; B61L 1/02; Y02T 10/70; B60M 7/003; B60M 1/04
USPC ....... 320/107, 108, 114, 136, 138, 140, 104; 104/5, 34, 106, 108, 112, 118, 119, 120, 104/127, 129, 288, 261
See application file for complete search history.

(56) References Cited

U.S. PATENT DOCUMENTS

| | | | |
|---|---|---|---|
| 4,872,136 A | 10/1989 | Cieri et al. | |
| 5,960,717 A * | 10/1999 | Andre | ...................... B60M 1/34 104/139 |
| 6,520,830 B1 * | 2/2003 | Vollmar | ................. A63H 21/02 104/93 |

(Continued)

*Primary Examiner* — Edward Tso
(74) *Attorney, Agent, or Firm* — The Small Patent Law Group LLC; John P. Darling (57) ABSTRACT

A charging system for an electric vehicle has an elongate enclosure having a plurality of sides and an at least partially open side. The enclosure defines a hollow interior. The charging system further includes a conductor rail disposed in the hollow interior and that is accessible through the at least partially open side of the enclosure. The conductor rail may be placed in electric communication with an electrical power source and thereby may be selectively placed in electrical communication with an electrical connector of an electric vehicle. The charging system may conduct electric current from the electrical power source to an electric power supply of the electric vehicle.

17 Claims, 4 Drawing Sheets

(56) References Cited

U.S. PATENT DOCUMENTS

| | | |
|---|---|---|
| 8,583,299 B2 | 11/2013 | Goodermuth et al. |
| 8,655,517 B2 | 2/2014 | Brand et al. |
| 8,767,369 B2 | 7/2014 | Kuttenkuler et al. |
| 8,825,239 B2 | 9/2014 | Cooper et al. |
| 8,903,574 B2 | 12/2014 | Cooper et al. |
| 9,008,879 B2 | 4/2015 | Kumar et al. |
| 9,120,494 B2 | 9/2015 | Kumar et al. |
| 9,746,452 B2 | 8/2017 | Worden et al. |
| 10,065,665 B2 | 9/2018 | Cooper et al. |
| 2009/0242173 A1 | 10/2009 | Mitchell et al. |
| 2013/0020164 A1* | 1/2013 | Asplund .................. B60L 5/40 191/29 R |
| 2013/0025992 A1* | 1/2013 | Asplund .................. B60L 5/42 191/22 C |
| 2019/0176862 A1 | 6/2019 | Kumar et al. |

* cited by examiner

CHARGING SYSTEM FOR ELECTRIC VEHICLES

CROSS-REFERENCE TO RELATED APPLICATIONS

This application is a continuation-in-part of U.S. application Ser. No. 15/592,947, filed 11 May 2017, now U.S. Pat. No. 10,406,922, which claims priority to U.S. Provisional Application No. 62/335,318, filed 12 May 2016. The entire disclosure of each of these applications is incorporated herein by reference.

BACKGROUND

Technical Field

The disclosure includes embodiments relating to a charging system for electric vehicles.

Discussion of Art

Several techniques have been used to convey power to electric vehicles, particularly public transit vehicles, such as buses, trains, subways, and trolleys. Frequently, trains and subways run on tracks accompanied by a third rail that conveys electric power to the vehicle. Electric buses and trolleys frequently travel on or alongside streets and cannot make use of a third rail due to the presence of pedestrians and other types of vehicles. These electric vehicles are powered via overhead catenary wires strung above the street or trolley tracks. The electric bus or trolley includes a collector extending above the vehicle to contact the catenary wires as the vehicle travels.

The use of catenary wires presents several issues with respect to powering an electric vehicle. The vehicle must be in constant or frequent contact with the wires so that the wires must be strung along larger distances. Wires are exposed to environmental elements and are, accordingly, prone to degradation unless maintained. It may be desirable to have a system and method that differs from those that are currently available.

BRIEF DESCRIPTION

In one embodiment, a system is provided that has an elongate enclosure having a plurality of sides and an at least partially open side, the enclosure defining a hollow interior. The system further includes a conductor rail disposed in the hollow interior and that is accessible through the at least partially open side of the enclosure. The conductor rail may be placed in electric communication with an electrical power source and thereby may be selectively placed in electrical communication with an electrical connector of an electric vehicle. The system may conduct electric current from the electrical power source to an electric power supply of the electric vehicle. The system may be external to the electric vehicle. For example, the system may be outside of the electric vehicle and may not move with the electric vehicle.

According to one example, a charging system for electric vehicles includes an electric power supply onboard the electric vehicle and a charging module comprising an enclosure having a plurality of sides and an at least partially open side. The enclosure defines a hollow interior. A conductor rail is disposed in the at least partially open side of the enclosure. The conductor rail is able to be placed in electric communication with an electrical power source. At least one insulator is disposed in the at least partially open side of the enclosure adjacent to the conductor rail. The at least one insulator is disposed between the conductor rail and at least one of the sides of the enclosure. The conductor rail may conduct electric current from the electrical power source to the electric power supply of the electric vehicle. Further details may be read in the detailed description in conjunction with the accompanying drawing figures, wherein like parts are designated with like reference numerals throughout.

DETAILED DESCRIPTION

The disclosure includes embodiments relating to a charging system for electric vehicles. In particular, embodiments may relate to an in-ground recharging station for an electric vehicle. As used herein, the term "in-ground" refers to within a surface on which the electric vehicle operates. Examples of surfaces on which electric vehicles may be operated include track beds, paved and unpaved roads, building floors, and other erected surfaces such as docks and piers. As used herein, the term "electric vehicle" refers to a vehicle for which at least some of the energy for moving the vehicle is derived from an electric power supply stored onboard the vehicle. Examples of electric vehicles include, but are not limited to, battery electric vehicles, capacitor electric vehicles, hybrid electric vehicles including series and parallel hybrid electric vehicles, and plug-in hybrid electric vehicles. The electric vehicles may be autonomous, or self-driving, vehicles. As used herein the term "autonomous vehicle" refers to a vehicle that operates, or is capable of operating, without direct real time control by an operator. Examples of an electric power supply may include such as a battery, a fuel cell, and/or a capacitor.

Figure 1:
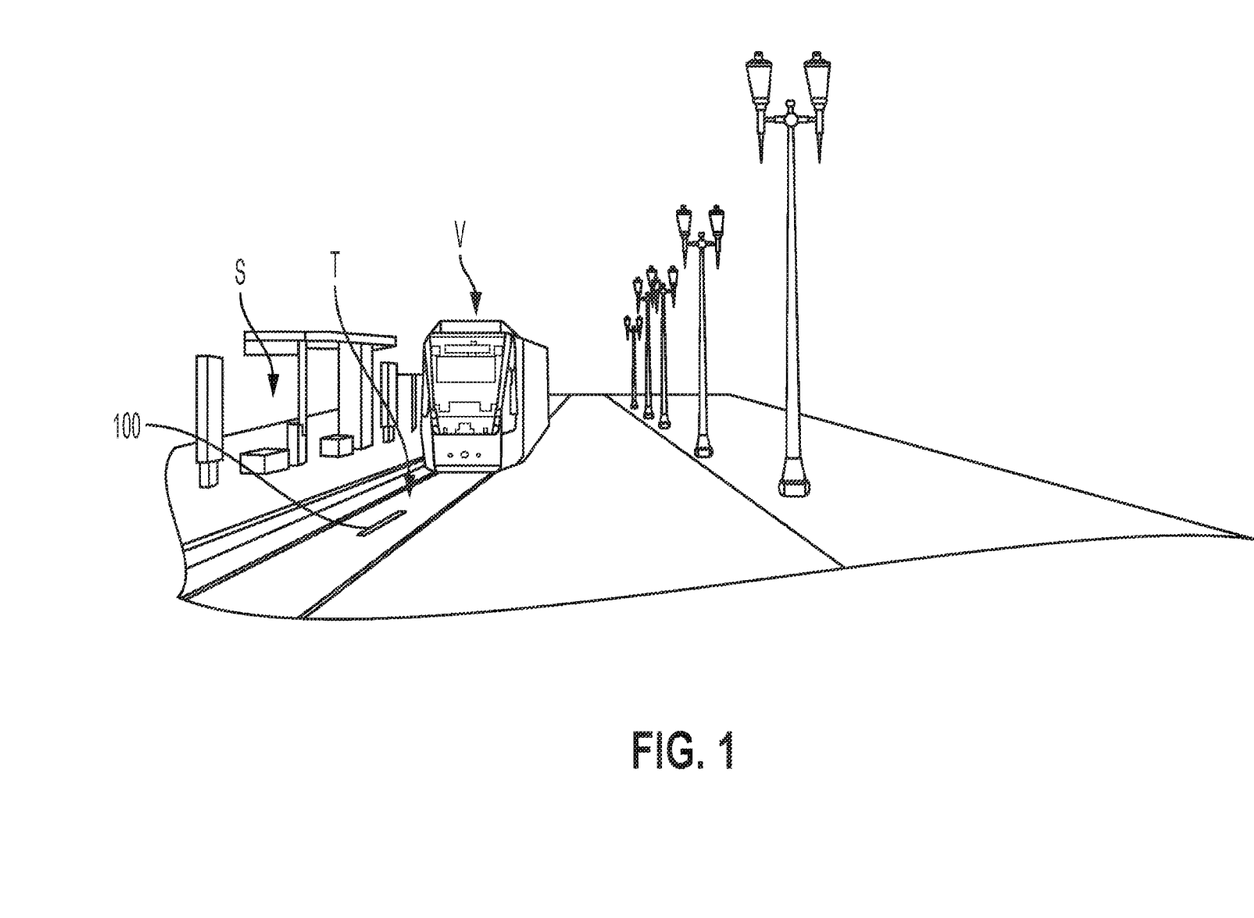
FIG. 1 depicts a system for charging an electric vehicle using an in-ground charging module according to an example of the disclosure.

Referring to FIG. 1, a system for charging an electric vehicle V includes an in-ground charging module 100. As shown in the figure, the electric vehicle may be an electric trolley or tram travelling along tracks T operating at street level. In other embodiments the electric vehicle may be another type of vehicle. Suitable other vehicles may include an automobile, truck, agricultural vehicle, mining vehicle, and the like. The in-ground charging module may be installed in the ground such that a side of the charging module is level with a paved surface between the tracks T. For electric vehicles that do not travel on tracks, the charging module may be installed in-ground of the surface on which the electric vehicle operates, so that the side surface of the charging module is level, or flush, with the surface on which the electric vehicle operates. In one embodiment, the side that is flush or level or the surface is a top side relatively speaking with the direction of up being relative to gravity. For example, for an electric vehicle operated in a warehouse charging module may be installed in-ground of a warehouse floor such that the side of the charging module may be level with the surface of the floor. A suitable electric vehicle for use in a warehouse may include a forklift. A suitable charging module may be installed along the tracks T at or near a station S so that the electric vehicle V may connect to the charging module to charge the internal batteries and/or capacitors of the charging module while loading and unloading passengers or may idle at the station S during scheduled breaks in the route of the vehicle without interfering with vehicle and/or pedestrian traffic in the surrounding streets and sidewalks. The charging module may be placed in a location suitable for charging an electric vehicle V with a corresponding mating structure (e.g., a collector). In one embodiment, the side surface is not fully level but rather forms a smooth protuberance such that it extends upwards from the floor by a small distance. In such case, it may be desirable to have a gradual transition so that the raised portion does not present a snagging or tripping hazard.

Figure 2:
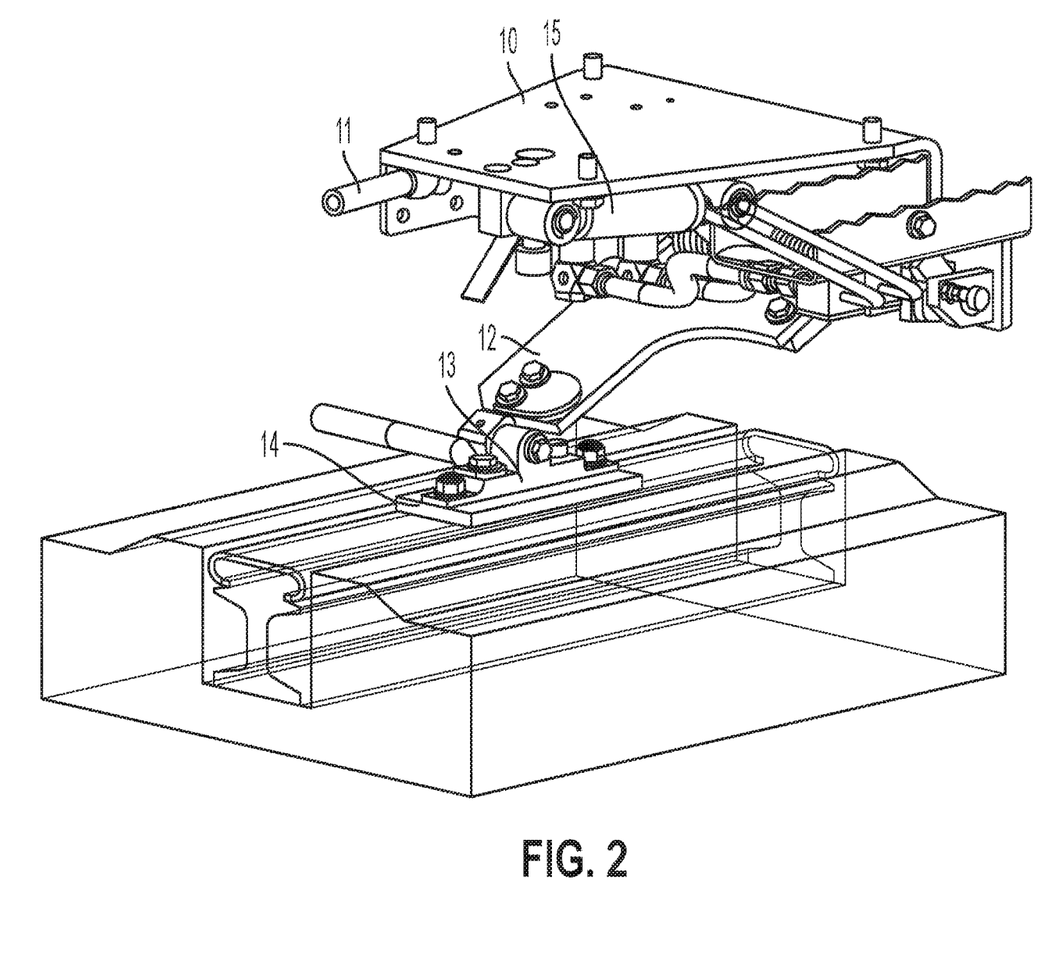
FIG. 2 depicts a collector for an electric vehicle according to an example of the disclosure.

Referring to FIG. 2, a collector for an electric vehicle V is disposed on a base frame 10 at the bottom of the electric vehicle V such that the electric vehicle V can be connected to the charging module when the vehicle is positioned over the charging module. The collector includes a terminal 11 to electrically couple the collector to the electric power system, including the electric power supply (battery and/or capacitor), of the electric vehicle V. A swing arm 12 is pivotably connected to the base frame 10 and is actuated by an actuator 15, for example a hydraulic piston or linear stepper motor, to move between a raised position near the base frame and a lowered or deployed position to connect to the charging module. A collector shoe 13 is connected to an end of the swing arm 12. The collector shoe includes an electric contact 14 at its bottom. A suitable electric contact may be a metal contact, or a contact formed using an electrically conductive polymeric material (or filled polymeric material). A suitable metal may be aluminum, steel or copper. The collector shoe establishes an electrical connection between the electric power system of the electric vehicle V and the charging module by engaging the charging module with the electric contact so that current is able to flow from the charging module to the electric power supply of the electric vehicle V.

Figure 3:
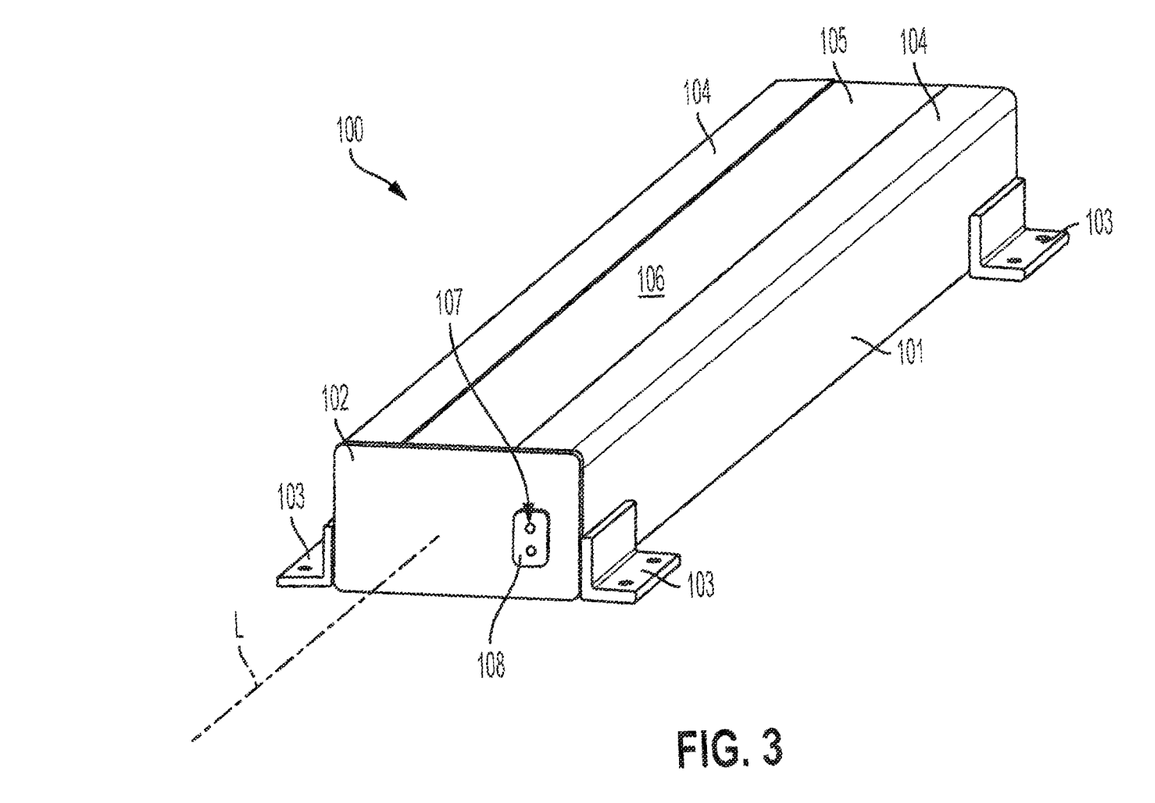
FIG. 3 depicts a perspective view of the charging module according to an example of the disclosure.
Figure 4:
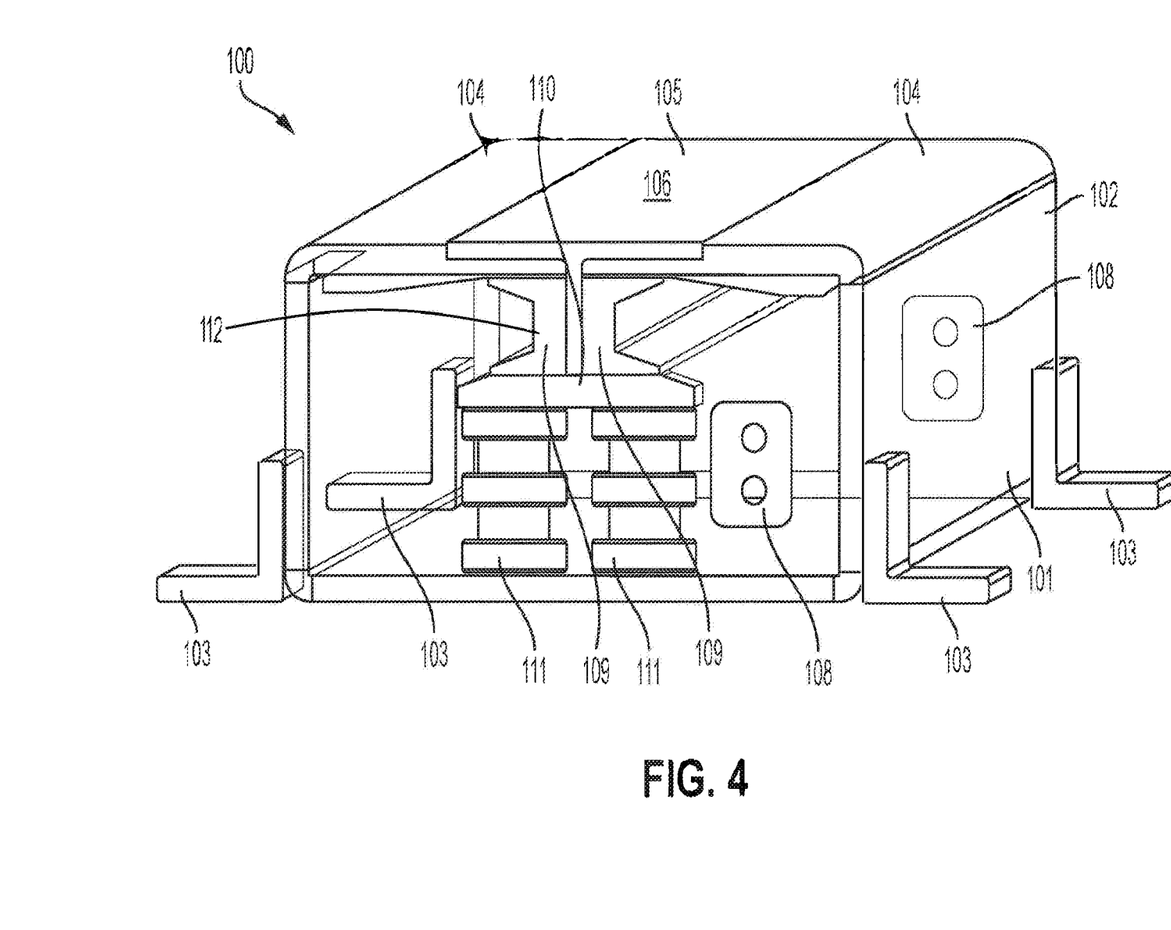
FIG. 4 depicts another perspective view of the charging module of FIG. 3 with some of the sides of the charging module rendered in phantom.

Referring to FIGS. 3 and 4, the charging module 100 includes an enclosure having a plurality of sides and an at least partially open side. The sides of the enclosure define a hollow interior for housing certain components of the charging module. In particular, the enclosure includes an open-sided tube 101 extending along a longitudinal axis L. The open-sided tube may define a channel or a groove. The tube itself may be formed of metal. Suitable metal may include aluminum, steel or copper. In another embodiment, the tube may be formed from a non-metallic material. Suitable non-metallic materials may include plastics and silicones, which may be filled or un-filled. The tube of the enclosure defines the lateral sidewalls and the bottom of the enclosure. The enclosure may include one or more insulated end plates 102 disposed at the longitudinal ends of the tube. The charging module may also include at least one mounting bracket 103 connected to the enclosure for connecting the charging module to an in-ground support surface. The mounting bracket may fasten to the sides of the enclosure and to an in-ground support surface. As shown, the charging module includes four mounting brackets connected to the lateral sidewalls of the tube near the end plates. The mounting brackets may fasten or connect the charging module to the ground support surface to prevent unintended movement or displacement of the charging module.

As shown in FIGS. 3 and 4, the charging module also includes a conductor rail 105, 109 disposed in the at least partially open side of the tube. The conductor rail may be placed in electric communication with an electrical power source, as will be discussed below. The conductor rail may be contacted by the collector of the electric vehicle to transmit electric current from the electrical power source to the electric vehicle. In one embodiment, the contact may be by the electric contact on the collector shoe of the collector discussed above with reference to FIG. 2. The conductor rail may extend parallel or substantially parallel to the longitudinal axis L of the enclosure and may include a T-shaped plate 105 and two conductive rods 109 connected to and in contact with a depending portion 112 of the T-shaped plate. In other embodiments the plate may be shaped differently. The depending portion of the T-shaped plate may be disposed between the two conductive rods. The two conductive rods connect to the electrical power source and place the T-shaped plate in electrical communication with the electrical power source. The conductive rods may be shaped such that they can be directly fastened to the T-shaped plate via a fastener. A suitable fastener may be a huck bolt. The T-shaped plate may define a side surface 106 that can engage with the collector of the electric vehicle. This engagement may be by the electric contact of the collector discussed above.

The T-shaped plate may be made of metal and of sufficient grade to be adequately conductive and corrosion resistant. The conductive rods may be made from metal. Suitable metals for the foregoing may include aluminum, steel and copper. The conductive rods have a higher conductivity than the T-shaped plate so that the charging module is able to meet the electrical requirements for recharging the electric vehicle V. The T-shaped plate and the conductive rods can be made from a material suitable to conduct electricity from the charging module to the electric vehicle V to charge the onboard electric power supply of the electric vehicle V.

Referring again to FIGS. 3 and 4, the charging module also includes an insulator 104 disposed in the partially open side of the tube adjacent to the conductive rail. The insulator is disposed between the conductor rail and at least one side of the tube. The insulator engages the conductor rail and the sides of the tube to seal the enclosure. The insulator extends side by side with the conductor rail parallel to the longitudinal axis L of the tube to separate the conductor rail from the lateral sides of the tube. As shown, the insulator includes two insulator strips extending parallel to the longitudinal axis L between the conductor rail and respective opposing lateral sides of the tube of the enclosure. The insulator may be in the form of strips. Suitable insulators may be made from rubber, thermoplastic, or thermoset. The insulator may be extruded in one embodiment. The insulator strips may be profiled to engage and connect to the sides of the tube and to engage and connect to the T-shaped plate of the conductor rail. As shown in FIG. 4, the insulator strips extend between the sides of the conductive rods and the internal or bottom surface of the side portion of the T-shaped plate to electrically isolate the side portion of the T-shaped plate from the conductive rods.

The insulators may close and seal the partially open side of the tube to prevent the buildup of debris and other contaminants in the enclosure. However, the enclosure of the charging module need not be sealed to be completely water-tight and some water may seep around the external insulator strips. Weep or drainage holes may be provided in the bottom of the tube to allow for drainage of moisture from the enclosure.

As shown in FIG. 4, the charging module also includes a plurality of insulator elements 110, 111 disposed within the enclosure. The insulator elements engage the conductor rail to support the conductor rail and isolate the conductor rail from the sides of the tube. The insulator elements include at least one rail clamp 110 positioned directly beneath and secured to the conductor rail and can assist in clamping the conductive rods with the dependent portion of the T-shaped plate. The insulator elements may include two insulator standoffs 111 fixed to the bottom of the steel tube of the enclosure. The conductor rail is mounted on side of the rail clamp and insulator standoffs, which support the conductor rail such that the conductor rail is positioned in the partially open side of the tube. The rail clamps and insulator standoffs also electrically isolate the conductor rail from the tube to prevent loss of current from the conductor rail through the tube. The rail clamps 110 and insulator standoffs may be connected or fastened to each other. As shown, the charging module includes two rail clamps and four insulator standoffs arranged so that one rail clamp and two insulator standoffs may be positioned at each of the opposing longitudinal ends of the conductor rail. Suitable rail clamps and insulator standoffs may be made from a composite. A suitable composite may be fiberglass.

As shown in FIGS. 3 and 4, the charging module includes at least one feeder connection 107 disposed in a side of the enclosure. The at least one feeder connection may connect the charging module to the electrical power source. The at least one feeder connection is electrically connected and in communication with the conductive rods of the conductor rail via electrical cables, wires, and/or terminals (not shown) disposed between the conductive rods and the at least one feeder connection. As shown in FIG. 4, the charging module includes two feeder connections 107 disposed in the opposing insulated end plates 102 of the enclosure. Each feeder connection is separately connected to the conductive rods of the conductor rail. Each feeder connection includes feeder lugs that may connect to different sizes of power cables. The feeder connections also each include a rubber grommet 108 disposed in the respective end plates of the enclosure. The rubber grommet 108 surrounds the feeder lugs to support and protect the feeder lugs. The charging module may connect to the external power source via a power cable (not shown) coupled to the feeder connections. The power cables may form part of a dedicated power line extending along the tracks or route of the electric vehicle, which may be controlled and operated by the transit authority or company operating the electric vehicle, either autonomously or via a human operator. Multiple charging modules may be electrically connected in series via the feeder connections to achieve charging modules of greater effective length.

The charging module may be installed in a ground surface with the enclosure buried and levelled such that the side surface of the T-shaped plate of the conductor rail may be disposed at or near the ground surface for connection to the electric vehicle. The charging module is buried in place on the in-ground support surface by the mounting brackets, which may accommodate the height tolerance requirement for the charging module. The charging module is designed to be sealed and self-contained to prevent or limit contaminants from entering the enclosure. The external insulators, end walls, grommets, and internal insulator elements may electrically insulate the charging module to limit or prevent the loss of current from transmission to the vehicle via the conductor rail. To that end, the insulation may be sufficient to insulate the conductor rail.

The charging module may further include heating elements (not shown) that run along the intersection between the side portion and the depending portion of the T-shaped plate between the external insulators. The heating elements may reduce or prevent freezing over of the side surface of the T-shaped plate, which may interfere with establishing a proper electrical connection between the conductor rail and the collector shoe of the electric vehicle.

The charging module may be such that electric current is delivered to the conductor rail when a collector of an electric vehicle is in contact with the T-shaped plate. The charging module may incorporate a switch that responds to a sensor on the charging module or to a signal from the electric vehicle via the collector and the conductor rail to allow current from the external power source to the conductor rail. In this manner, current to the conductor rail is shut off and the charging module is rendered inert unless the collector shoe of the electric vehicle is in engagement with the conductor rail of the charging module. When an electric vehicle is positioned to be charged by the charging module, the switch is opened to allow the conductor rail to be energized to transmit current to the electric vehicle via the collector shoe. When charging is complete, the collector may retract, as discussed above, and disconnect from the conductor rail. This may cause the switch to close and render the charging module inert.

In one embodiment, an interfacing device for interfacing a traction load to a voltage source is presented. The collector shoe interfacing device includes a first charging unit coupled in parallel to the voltage source. Further, the collector shoe interfacing device includes a second charging unit coupled in parallel to the traction load, where the second charging unit includes at least one inductor. Also, the collector shoe interfacing device includes a pre-charging unit coupled in parallel to the second charging unit and can pre-charge the first charging unit with a voltage across the at least one inductor prior to electrically coupling the first charging unit to the voltage source. In addition, the collector shoe interfacing device includes a voltage converting unit disposed between the first charging unit and the second charging unit and may step down a voltage provided by the voltage source to the traction load.

In accordance with an aspect, a method for interfacing a traction load to a voltage source is presented. The method includes decoupling a first charging unit of a collector shoe interfacing device from the voltage source. Further, the method includes activating a pre-charging unit of the collector shoe interfacing device to energize at least one inductor in a second charging unit of the collector shoe interfacing device. The method includes deactivating the pre-charging unit to provide a voltage across the at least one energized inductor to the first charging unit prior to electrically coupling the first charging unit to the voltage source, where the first charging unit is pre-charged with the provided voltage to prevent a surge current flow from the voltage source while the first charging unit is operatively coupled to the voltage source.

A system for driving a traction load is presented. The system includes a voltage source that can supply a direct current (DC) voltage to drive the traction load. Further, the system includes a collector shoe interfacing device disposed between the voltage source and the traction load and can step down the DC voltage supplied from the voltage source to the traction load. The collector shoe interfacing device includes a first charging unit coupled in parallel to the voltage source, a second charging unit coupled in parallel to the traction load, where the second charging unit includes at least one inductor, a pre-charging unit coupled in parallel to the second charging unit and can pre-charge the first charging unit with a voltage across the at least one inductor prior to electrically coupling the first charging unit to the voltage source, and a voltage converting unit disposed between the first charging unit and the second charging unit and can step down a voltage provided by the voltage source to the traction load.

An interfacing kit for interfacing a traction load to a voltage source is presented. The interfacing kit includes a pre-charging unit that can pre-charge a first charging unit with a voltage across at least one inductor in a second charging unit prior to electrically coupling the first charging unit to the voltage source. The pre-charging unit may be coupled in parallel to a voltage converting unit and the second charging unit.

In one embodiment, the system may include a bleed resistor coupled to the conductor rail. If the system has been charged for a long time or if it has discharged incompletely the bleed resistor de-energizes the conductor rail. That is, the system may develop a small voltage from, for example, time-delayed dipole discharging—also called dielectric relaxation, soakage, or battery action. To reduce or prevent shocks, the bleed resistor or equivalent circuit may reduce residual electrical charge on the conductor rail when not actively charging the electric vehicle.

In one embodiment, a system is provided that includes an elongate enclosure having a plurality of sides and an at least partially open side, the enclosure defining a hollow interior, and a conductor rail disposed in the hollow interior and accessible through the at least partially open side of the enclosure, the conductor rail being configured to be placed in electric communication with an electrical power source and to be selectively placed in electrical communication with an electrical connector of an electric vehicle and thereby to conduct electric current from the electrical power source to an electric power supply of the electric vehicle.

The conductor rail may include a plate and conductive rods in contact with a depending portion of the plate, the depending portion of the plate disposed between the conductive rods, the conductive rods may place the plate in electrical communication with the electrical power source, the plate may engage a collector of the electric vehicle. Suitable conductive rods may have a greater electrical conductivity than the plate.

In one embodiment, the enclosure itself may be an insulator and have a thickness through the non-open sides of the plurality of sides sufficient to prevent or block the flow of electricity from the conductor rail through the non-open sides of the enclosure. Alternatively, there may be at least one insulator disposed in the at least partially open side of the enclosure, the at least one insulator disposed between the conductor rail and at least one of the sides of the enclosure. The enclosure may extend along a longitudinal axis and the conductor rail and the at least one insulator extends side-by-side parallel to the longitudinal axis of the enclosure. The at least one insulator may include plural insulators extending parallel to the longitudinal axis between the conductor rail and opposing sides of the enclosure.

If an insulator elements or layer is provided, then the enclosure may be a conductive tube extending along the longitudinal axis and defining bottom and lateral sides of the enclosure and insulated end plates disposed at the longitudinal ends of the conductive tube. The insulator elements disposed within the hollow interior of the enclosure, wherein at least one of the insulator elements engages the conductor rail to support the conductor rail and electrically isolate the conductor rail from the bottom and lateral sides of the conductive tube.

The at least one feeder connection may connect with the electrical power source. The at least one feeder connection may be in electrical communication with the conductor rail. The feeder connection may be disposed in at least one of the insulated end plates. The feeder connection comprises feeder lugs may connect with different sized power cables. The insulator may engage the conductor rail and the enclosure to seal the enclosure.

In one embodiment, a first charging unit (not shown) may be coupled in parallel to the energy source. A second charging unit (not shown) may be coupled in parallel to a battery or a traction motor of the electric vehicle. The second charging unit may include at least one inductor. A pre-charging unit may be coupled in parallel to the second charging unit and configured to pre-charge the first charging unit with a voltage across the at least one inductor prior to electrically coupling the first charging unit to the energy source. A voltage converting unit may be disposed between the first charging unit and the second charging unit and may step down a voltage provided by the energy source to the battery or traction motor.

In one embodiment, a switch may selectively energize and to de-energize the conductor rail based at least in part on the presence of the electric vehicle coupled to the conductor rail. One or more bleed resistors may be coupled to the conductor rail that can bleed off a remaining charge in the conductor rail after the conductor rail has decoupled from at least one of the electric vehicle and the energy source. The remaining charge may be either residual or a gradual rebuild of charge.

In one embodiment, a transformer or converter may be coupled to the conductor rail between the conductor rail and the energy source. And, optionally, a wear-protective coating film that is electrically conductive may be disposed at least on an exposed face of the conductor rail. The shoe conductor that contacts the conductor rail may have a compliant section to control contact force between the current collector of the electric vehicle and the inventive system's conductor rail.

In one embodiment, the system may include at least one of a heater, a spark arrestor and circuit interrupter coupled to the conductor rail. These may be selected and employed based in part on application specific parameters. For example, in a cold and icy climate, the heater may be selected and employed. The spark arrestor and circuit interrupt may de-energize the conductor rail in response to at least one of a short, a spark, a surge, and a ground fault of the conductor rail. The heater may melt ice covering the conductor rail.

In one embodiment, an in-ground enclosure defines a hollow interior that is at least partially open along at least one side of the enclosure; a conductor rail may be disposed in the enclosure, the conductor rail may be placed in electric communication with a power source; and an insulator may be disposed in the enclosure. The insulator may be disposed between the conductor rail and at least one side of the enclosure. The conductor rail may conduct electric current from the electrical power source to an electric power supply of an electric vehicle while the vehicle is above the enclosure. The conductor rail may include a plate and conductive rods in contact with a depending portion of the plate. The depending portion of the plate may be disposed between the conductive rods. The conductive rods may place the plate in electrical communication with the electrical power supply. The plate may engage a collector of the electric vehicle. The conductive rods may have a greater electrical conductivity than the plate.

While specific examples have been described in detail, modifications and alternatives to those details could be developed in light of the overall teachings of the present disclosure. The present disclosure is illustrative only and not limiting as to the scope of the claimed inventions, which may be to be given the full breadth of the appended claims and any and all equivalents thereof

What is claimed is:

1. A system comprising:
an elongate enclosure having a plurality of sides and an at least partially open side, the enclosure defining a hollow interior; and
a conductor rail disposed in the hollow interior and accessible through the at least partially open side of the enclosure, the conductor rail being configured to be placed in electric communication with an electrical power source and to be selectively placed in electrical communication with an electrical connector of an electric vehicle and thereby to conduct electric current from the electrical power source to an electric power supply of the electric vehicle that is positioned external to the enclosure, wherein the conductor rail comprises a plate and conductive rods in contact with a depending portion of the plate, the depending portion of the plate disposed between the conductive rods, the conductive rods configured to place the plate in electrical communication with the electrical power source, the plate configured to engage a collector of the electric vehicle and the conductive rods have a greater electrical conductivity than the plate.

2. The system according to claim 1, wherein the enclosure is an insulator and has a thickness through non-open sides of the plurality of sides sufficient to prevent or block conduction of electricity from the conductor rail through the non-open sides of the enclosure.

3. The system according to claim 1, further comprising at least one insulator disposed in the at least partially open side of the enclosure, the at least one insulator disposed between the conductor rail and at least one of the sides of the enclosure.

4. The system according to claim 3, wherein the enclosure extends along a longitudinal axis and the conductor rail and the at least one insulator extends side-by-side parallel to the longitudinal axis of the enclosure.

5. The system according to claim 4, wherein the at least one insulator comprises plural insulators extending parallel to the longitudinal axis between the conductor rail and opposing sides of the enclosure.

6. The system according to claim 4, wherein the enclosure comprises a conductive tube extending along the longitudinal axis and defining bottom and lateral sides of the enclosure and insulated end plates disposed at the longitudinal ends of the conductive tube.

7. The system according to claim 3, further comprising insulator elements disposed within the hollow interior of the enclosure, wherein at least one of the insulator elements engages the conductor rail to support the conductor rail and electrically isolate the conductor rail.

8. The system according to claim 1, further comprising at least one feeder connection configured to connect with the electrical power source, wherein the at least one feeder connection is in electrical communication with the conductor rail.

9. The system according to claim 8, wherein the at least one feeder connection is disposed in at least one of insulated end plates, and at least one feeder connection comprises feeder lugs configured to connect with different sized power cables.

10. The system according to claim 8, wherein at least one insulator is configured to engage the conductor rail and the enclosure to seal the enclosure.

11. The system according to claim 1, further comprising:
a first charging unit coupled in parallel to the electrical power source;
a second charging unit coupled in parallel to a power supply or a traction motor of the electric vehicle, wherein the second charging unit comprises at least one inductor;
a pre-charging unit coupled in parallel to the second charging unit and configured to pre-charge the first charging unit with a voltage across the at least one inductor prior to electrically coupling the first charging unit to the electrical power source; and
a voltage converting unit disposed between the first charging unit and the second charging unit and configured to step down a voltage provided by the electrical power source to the power supply or traction motor of the electric vehicle.

12. The system according to claim 1, further comprising a switch configured to selectively energize and to de-energize the conductor rail based at least in part on a presence of the electric vehicle coupled to the conductor rail.

13. The system according to claim 1, further comprising one or more bleed resistors coupled to the conductor rail that are configured to bleed off remaining charge in the conductor rail after the conductor rail has decoupled from at least one of the electric vehicle and the electrical power source.

14. The system according to claim 1, further comprising a transformer or converter coupled to the conductor rail between the conductor rail and the electrical power source.

15. The system according to claim 1, further comprising a wear-protective coating film that is electrically conductive and disposed at least on an exposed face of the conductor rail.

16. The system according to claim 1, further comprising at least one of a heater, a spark arrestor and circuit interrupter coupled to the conductor rail; and
the spark arrestor and circuit interrupt being configured to de-energize the conductor rail in response to at least one of a short, a spark, a surge, and a ground fault of the conductor rail, and the heater being configured to melt ice covering the conductor rail.

17. A system comprising:
an in-ground enclosure defining a hollow interior that is at least partially open along at least one side of the enclosure;
a conductor rail disposed in the enclosure, the conductor rail configured to be placed in electric communication with a power source; and
an insulator disposed in the enclosure, the insulator disposed between the conductor rail and at least one side of the enclosure, wherein the conductor rail is configured to conduct electric current from the electrical power source to an electric power supply of an electric vehicle while the vehicle is above the enclosure; and
the conductor rail comprises a plate and conductive rods in contact with a depending portion of the plate, the depending portion of the plate disposed between the conductive rods, the conductive rods configured to place the plate in electrical communication with the electrical power supply, the plate configured to engage a collector of the electric vehicle, and the conductive rods have a greater electrical conductivity than the plate.

* * * * *